Patented Apr. 7, 1925.

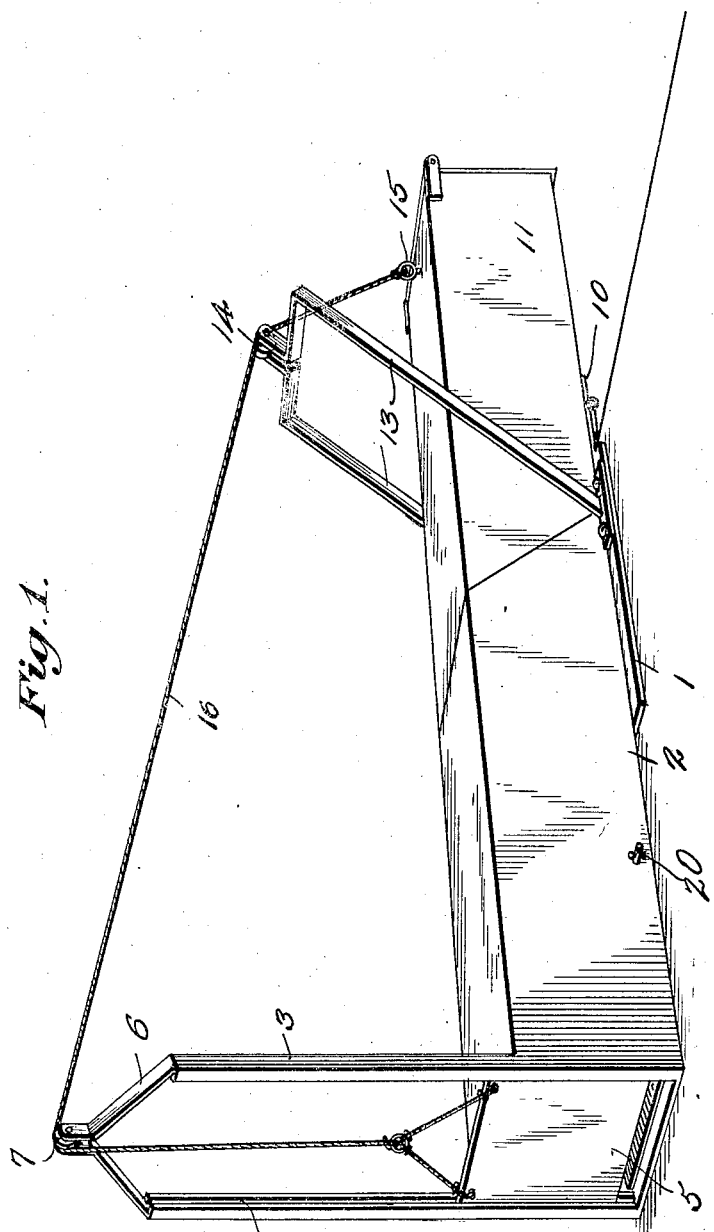

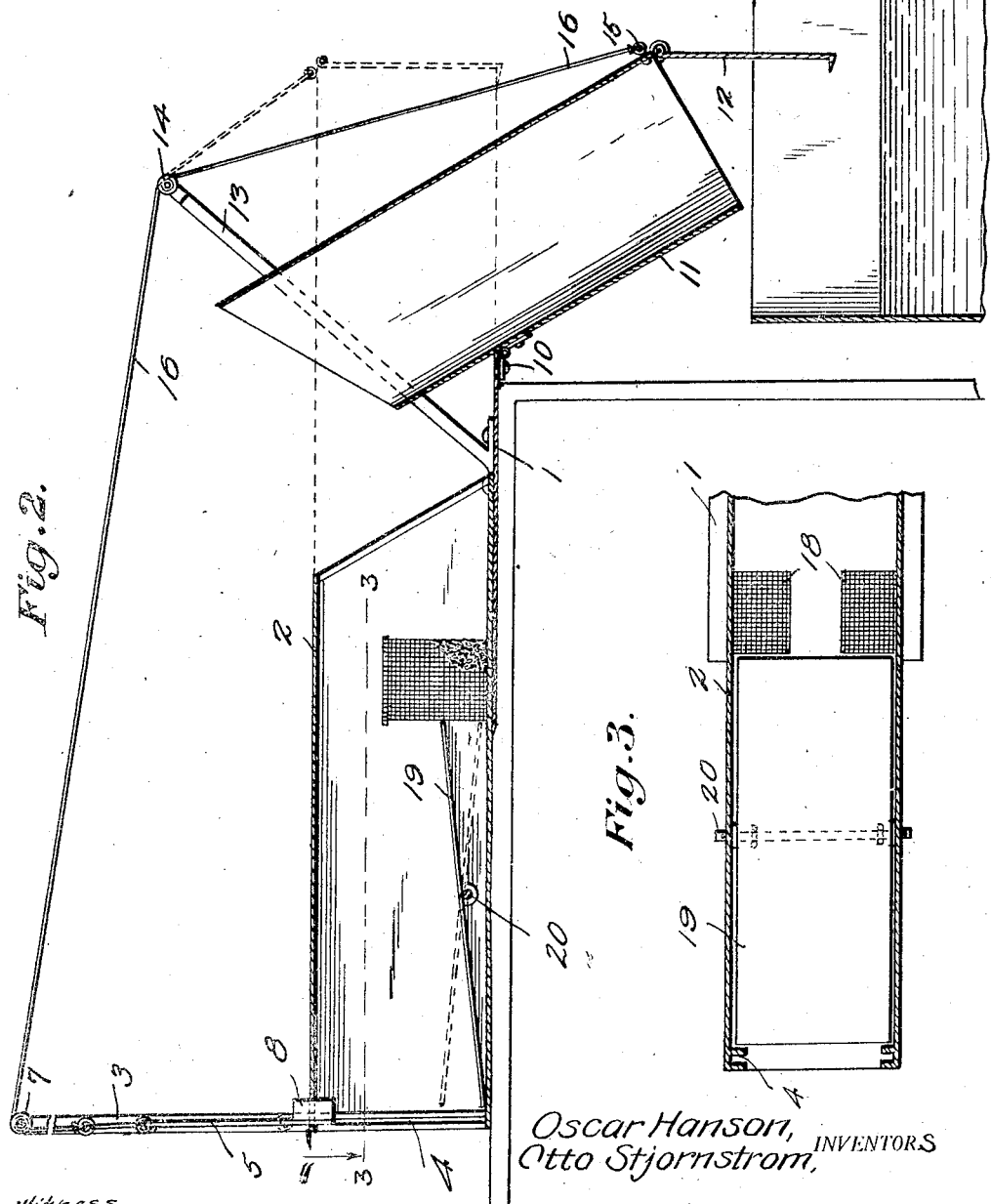

1,532,584

UNITED STATES PATENT OFFICE.

OSCAR HANSON, OF WARDER, BRITISH COLUMBIA, AND OTTO STJORNSTROM, OF CALGARY, CANADA.

TRAP.

Application filed September 4, 1920. Serial No. 408,402.

*To all whom it may concern:*

Be it known that we, OSCAR HANSON and OTTO STJORNSTROM, subjects of the King of England and the King of Sweden, respectively, residing at Warder, British Columbia, Canada, and Calgary, Canada, respectively, have invented certain new and useful Improvements in Traps, of which the following is a specification.
This invention relates to traps which are especially adapted for catching gophers.

The principal object of the invention is to generally improve upon traps of this character by providing a device which will be extremely simple, durable and inexpensive in construction, one which is efficient and reliable in operation and well adapted to the purpose for which it is designed.

Another object of the invention is to provide a device of this nature which will always be set and will be automatically reset as soon as the animal has been caught.

With these and numerous other objects in view the invention resides in certain novel features of construction and the combination and arrangement of parts as will be hereinafter fully described and claimed.

In the accompanying drawings:

Figure 1 is a perspective view of the trap, and

Figure 2 is a longitudinal vertical section taken through the trap, and

Figure 3 is a section taken on the line 3—3 of Figure 2.
By referring to the accompanying drawings by numerals it will be seen that this device consists of the base plate 1 upon which is fixedly mounted the fixed section 2 which is substantially rectangular in shape and hollow. Both ends of this section 2 are open and the forward end is provided with the upwardly extending arms 3 having grooves 4 in the inner sides in which the door 5 will slide. The converging arms 6 are provided on the terminals of the legs 3 and support the pulley 7 for a purpose to be hereinafter set forth. Weights 8 are mounted upon the door 5 in any suitable manner for normally holding same in a closed position.

A hinge 10 is mounted upon the end of the base plate 1 and to this hinge is attached the movable section 11. Both ends of this movable section 11 are open and a swinging door 12 is attached to the outer end thereof as is clearly shown in Figure 2 of the drawing. A bracket 13 is fixedly attached to the base plate 1 and slants rearwardly and rotatably supports the pulley wheel 14. An eye bolt 15 is attached near the end of the movable section 11 and a cable 16 is attached to this eye bolt 15 and passes over the pulley wheels 14 and 7 and has its outer end fixedly attached to the sliding door 5 in any suitable manner. The weight 8 and the door 5 are of sufficient weight as to normally keep the movable section 11 in a horizontal position or in alignment with the fixed section 2 as shown in Figure 1 of the drawing and it will be noted that the length of the cable 16 is such that when the movable section 11 is in a closed position there will be a small space between the bottom of the section 2 and the door 5 through which the gopher may enter.

Within the section 2 we have mounted a pair of bait containers 18 which are formed of foraminous material and may be of any preferred construction. Between these bait containers 18 and the door 5 is disposed the platform 19 which is pivotally carried by the shaft 20. The forward side of the platform 19 is longer than the other side so that it will normally take the position shown in Figures 1 and 2 of the drawings. Thus it will be seen that when the trap is in the position shown in Figure 1 of the drawing the gopher will enter the small space allowed by the door 5 and run toward the bait container 18 over the platform 19. When the gopher has reached the inner end of this platform same will swing to take the position shown by the dotted lines in Figure 2. When the platform 19 is in this position it will be seen that the opening allowed by the door 5 will be closed by the longer section of the platform 19 and thus the gopher will be sufficiently frightened by the movement of the platform 19 as to have a desire to escape and seeing the opening by which he enters closed he will naturally run into the movable container 11. The weight of the gopher will be sufficient to counter-balance the weight of the door 5 and thus this section 11 will take the position shown in Figure 2 of the drawing and the gopher will be thrown into the receptacle 21 which is preferably half filled with water or any other suitable liquid. After the gopher has thus fallen into the container 21 the weight upon the door 5 will reset the trap by pulling the section 11 back to a horizontal position and at the same time close the door so as to leave the small opening through which the gopher originally entered.

We prefer to build this trap out of galvanized iron or any other like sheet metal but of course do not wish to limit ourselves to this particular material. Any suitable anchoring means may be used to hold the trap in a desired position.

From the foregoing description, taken in connection with the accompanying drawing, the construction and operation of this trap will be readily understood without a more extended explanation. As numerous changes in form, proportion, and in the minor details of construction may be resorted to without departing from the spirit of this invention, we do not wish to be limited to the construction herein shown and described other than as claimed.

Having thus described our invention what we claim as new is:—

A device of the class described comprising a fixed section, a movable section hingedly mounted adjacent said fixed section so as to move in and out of alignment therewith, a door slidably mounted on said fixed section, a cable connecting said door with said movable section and the weight of said door being sufficient to normally hold said movable section in alignment with said fixed section, said cable being only long enough to allow the door to partially close when the movable section is in alignment with the fixed section, and a platform rockably mounted in the fixed section so as to close the opening allowed by the door when closed in the manner and for the purpose specified.

In testimony whereof we affix our signatures in presence of two witnesses.

OSCAR HANSON.
OTTO STJORNSTROM.

Witnesses:
DANIEL V. EKSTRAND,
OLE PEDENSON.